United States Patent
Harada et al.

(10) Patent No.: US 12,377,950 B2
(45) Date of Patent: Aug. 5, 2025

(54) JOINT STRUCTURE AND ASSEMBLY METHOD FOR SAME

(71) Applicant: IHI Aerospace Co., Ltd., Gunma (JP)

(72) Inventors: Takashi Harada, Tokyo (JP); Yu Shigenari, Tokyo (JP); Ikuo Okumura, Tokyo (JP); Toyoharu Akimoto, Tokyo (JP)

(73) Assignee: IHI AEROSPACE CO., LTD., Tomioka (JP)

( * ) Notice: Subject to any disclaimer, the term of this patent is extended or adjusted under 35 U.S.C. 154(b) by 853 days.

(21) Appl. No.: 17/441,806

(22) PCT Filed: Apr. 12, 2019

(86) PCT No.: PCT/JP2019/015923
§ 371 (c)(1),
(2) Date: Sep. 22, 2021

(87) PCT Pub. No.: WO2020/208802
PCT Pub. Date: Oct. 15, 2020

(65) Prior Publication Data
US 2022/0169359 A1 Jun. 2, 2022

(51) Int. Cl.
*B64C 1/06* (2006.01)
*B64C 1/12* (2006.01)
(Continued)

(52) U.S. Cl.
CPC .............. *B64C 1/061* (2013.01); *B64C 1/12* (2013.01); *F16B 5/0607* (2013.01); *F16B 5/08* (2013.01);
(Continued)

(58) Field of Classification Search
CPC ........ F16B 5/0607; F16B 5/08; F16B 11/006; Y10T 403/472; B64C 1/064
See application file for complete search history.

(56) References Cited

U.S. PATENT DOCUMENTS 3,703,747 A    11/1972   Hamman
4,671,470 A *   6/1987   Jonas .................. B29C 66/1142
                                                        428/116

(Continued)

FOREIGN PATENT DOCUMENTS

CN    1190056 A      8/1998
JP    48-113546 U   12/1973
(Continued)

OTHER PUBLICATIONS

International Search Report, PCT/JP2019/015923, Jul. 30, 2019, 2 pgs.
(Continued)

*Primary Examiner* — Michael P Ferguson
(74) *Attorney, Agent, or Firm* — Volpe Koenig

(57) ABSTRACT

A joint structure includes a connection member provided between a reinforced member and a reinforcing member and connecting both of them to each other. The connection member includes a first coupling portion and a second coupling portion that are coupled to one and another of the reinforced member and the reinforcing member, respectively. The first coupling portion is coupled to a joint portion of one of the reinforced member and the reinforcing member by an adhesive or welding. The first coupling portion and the joint portion are shaped so as to be caught by each other in a joining direction in which the reinforced member and the reinforcing member are joined to each other.

9 Claims, 12 Drawing Sheets

(51) Int. Cl.
   *F16B 5/06*       (2006.01)
   *F16B 5/08*       (2006.01)
   *F16B 11/00*      (2006.01)

(52) U.S. Cl.
   CPC ............ *F16B 11/006* (2013.01); *B64C 1/064* (2013.01); *Y10T 403/472* (2015.01)

(56) References Cited

U.S. PATENT DOCUMENTS

| | | | |
|---|---|---|---|
| 6,374,570 B1 | 4/2002 | McKague, Jr. | |
| 6,945,727 B2* | 9/2005 | Christman | B64C 3/18 403/109.8 |
| 7,555,873 B2* | 7/2009 | Kilwin | F16B 17/008 244/131 |
| 7,670,527 B2* | 3/2010 | Malis | B29C 66/12441 156/303.1 |
| 8,840,979 B2* | 9/2014 | Cetiner | B64C 1/12 428/119 |
| 8,844,868 B2* | 9/2014 | Kolax | B64C 1/12 244/119 |
| 9,862,477 B2* | 1/2018 | Marks | B64C 1/065 |
| 2004/0011927 A1 | 1/2004 | Christman et al. | |
| 2007/0166098 A1 | 7/2007 | Roth et al. | |
| 2008/0230652 A1 | 9/2008 | Biornstad et al. | |
| 2013/0164465 A1 | 6/2013 | Lacombe et al. | |
| 2014/0272312 A1* | 9/2014 | Sammons | B64C 1/061 156/257 |
| 2016/0244140 A1* | 8/2016 | Abe | B29C 66/43441 |

FOREIGN PATENT DOCUMENTS

| | | |
|---|---|---|
| JP | 2004-507629 A | 3/2004 |
| JP | 2007-534538 A | 11/2007 |
| JP | 2008-222221 A | 9/2008 |
| JP | 2015-072042 A | 4/2015 |
| RU | 2006139669 A | 5/2008 |
| RU | 2578085 C2 | 3/2016 |
| WO | WO-2005/098241 A1 * 10/2005 ........... B23K 20/122 |

OTHER PUBLICATIONS

Written Opinion, PCT/JP2019/015923, Jul. 30, 2019, 4 pgs.
Office Action of corresponding Japanese Application No. 2019-529271 with English translation, Apr. 24, 2020, 8 pgs.
Chinese Office Action issued on Mar. 22, 2023 for Chinese Patent Application No. 201980095078.7.
Extended European Search Report issued on Mar. 14, 2022 for European Patent Application No. 19 924 628.1.
Russian Office Action issued on Apr. 27, 2022 for Russian Patent Application No. 2021129464.
Russian Search Report issued on Apr. 27, 2022 for Russian Patent Application No. 2021129464.
Written Opinion of the International Searching Authority mailed on Jul. 30, 2019 for PCT International Application No. PCT/JP2019/015923.
Chinese Office Action issued on Jun. 1, 2023 for Chinese Patent Application No. 201980095078.7.
Chinese Office Action issued on Sep. 5, 2022 for Chinese Patent Application No. 201980095078.7.

* cited by examiner

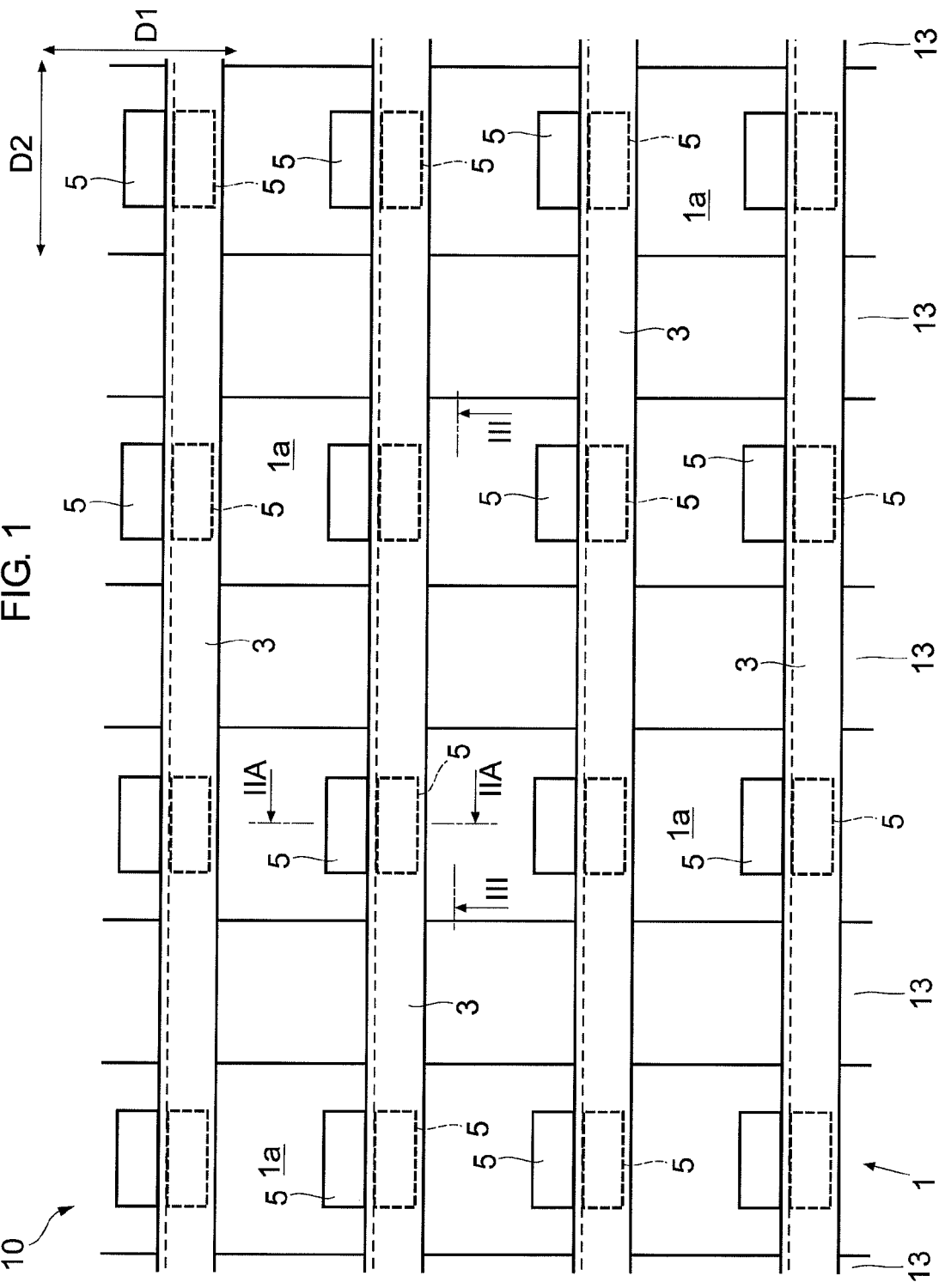

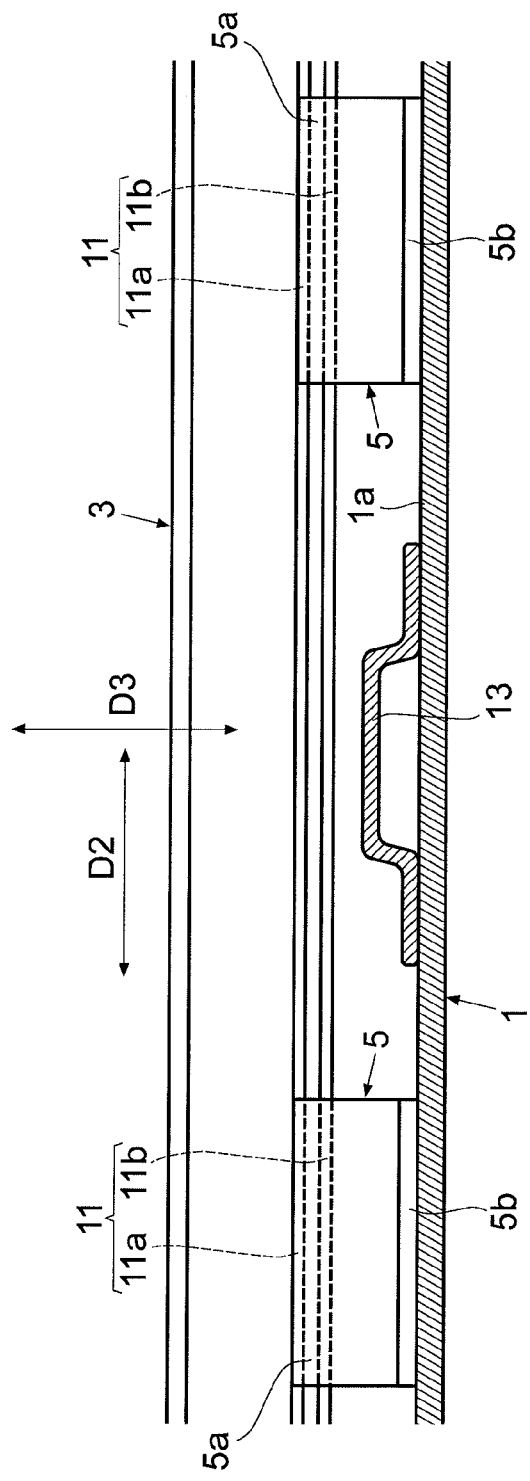

JOINT STRUCTURE AND ASSEMBLY METHOD FOR SAME

TECHNICAL FIELD

The present invention relates to a joint structure in which a reinforced member and a reinforcing member are coupled to each other, and relates to a method of assembling the joint structure.

BACKGROUND ART

When a body of an automobile, a fuselage of an aircraft, or another structure is constituted by a predetermined constituent member (reinforced member), the constituent member is coupled to a reinforcing member in order to increase mechanical strength of the constituent member. For example, according to Patent Literature 1, a barrel section (reinforced member) constituting a fuselage of an aircraft is coupled via a first frame section (connection member) to a second frame section (reinforcing member).

CITATION LIST

Patent Literatures

Patent Literature 1: Japanese Patent Application Laid-Open Publication No. 2008-222221

SUMMARY OF INVENTION

Technical Problem

When a reinforced member and a reinforcing member are coupled to each other via a connection member, the connection member coupled to the reinforced member is coupled to the reinforcing member by an adhesive and a bolt (or rivet). In other words, when the two members are coupled to each other by only an adhesive, mechanical strength of this coupled portion is insufficient. Thus, the two members are coupled to each other, additionally by a bolt or rivet (hereinafter, referred to also as a bolt or the like).

However, when the connection member is coupled to the reinforcing member by a bolt or the like, a penetration hole for passing of the bolt or the like needs to be formed in each of the connection member and the reinforcing member. The same applies to the case where the connection member is coupled to the reinforced member by a bolt or the like. Thus, it is desired that a bolt or the like is not used, or the number of used bolts and the like is reduced.

An object of the present invention is to enable securing of mechanical strength of a coupled portion between a connection member and one of a reinforced member and a reinforcing member when the one of the reinforced member and the reinforcing member is coupled to the connection member by an adhesive or welding without using a bolt or the like, in the case where the reinforced member and the reinforcing member are coupled to each other via the connection member.

Solution to Problem

In order to accomplish the above-described object, a structure according to the present invention is a joint structure in which a reinforced member and a reinforcing member are coupled to each other, the joint structure including:

a connection member provided between the reinforced member and the reinforcing member and connecting the reinforced member and the reinforcing member to each other, wherein the connection member includes a first coupling portion and a second coupling portion that are coupled to one and another of the reinforced member and the reinforcing member, respectively, and the first coupling portion is coupled to a joint portion of the one by an adhesive or welding, and the first coupling portion and the joint portion are shaped so as to be caught by each other in a joining direction in which the reinforced member and the reinforcing member are joined to each other.

A method according to the present invention is method of assembling a joint structure in which a reinforced member and a reinforcing member are coupled to each other, the method including:

(A) preparing the reinforced member, the reinforcing member, and a connection member, (B) coupling a first coupling portion of the connection member to one of the reinforced member and the reinforcing member, and coupling a second coupling portion of the connection member to another of the reinforced member and the reinforcing member, wherein (B) includes: arranging the first coupling portion and a joint portion of the one so as to be caught by each other in a joining direction in which the reinforced member and the reinforcing member are joined to each other; and coupling the first coupling portion and the joint portion to each other by an adhesive or welding.

Advantageous Effects of Invention

According to the present invention, when the connection member and the one of the reinforced member and the reinforcing member are coupled to each other by the adhesive or welding in a configuration in which the reinforced member and the reinforced member are connected via the connection member, the first coupling portion and the joint portion are shaped so as to be caught by each other in the joining direction in which the reinforced member and the reinforcing member are joined to each other. Accordingly, mechanical strength of a coupled portion between the joint portion and the connection member can be secured in the joining direction by coupling based on the adhesive or the welding and further by the first coupling portion and the joint portion being caught by each other in the joining direction.

BRIEF DESCRIPTION OF DRAWINGS

FIG. 1 illustrates a joint structure according to a first embodiment of the present invention.

FIG. 3 is a view of the arrows in FIG. 1.

DESCRIPTION OF EMBODIMENTS

Figure 2A:
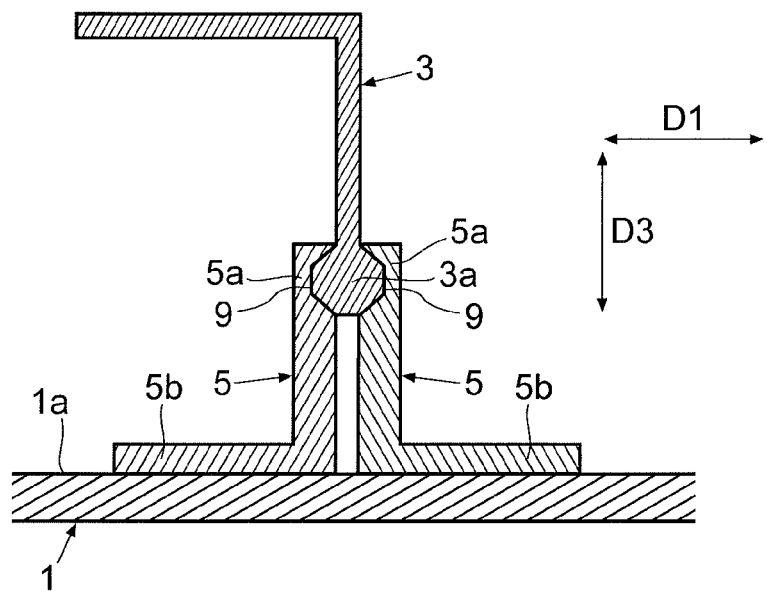
FIG. 2A is a view of the IIA-IIA arrows in FIG. 1.

The following describes embodiments of the present invention with reference to the drawings. In the drawings, the common parts are denoted by the same reference signs, and overlapping description is omitted.

First Embodiment

Configuration of Joint Structure

FIG. 1 illustrates a joint structure 10 according to a first embodiment of the present invention. FIG. 2A is a view of the IIA-IIA arrows in FIG. 1. FIG. 3 is a view of the arrows in FIG. 1. The joint structure 10 includes a reinforced member 1, a reinforcing member 3, and a connection member 5. In other words, the joint structure 10 is formed by coupling the reinforced member 1 and the reinforcing member 3 to each other via the connection member 5. The reinforced member 1, the reinforcing member 3, and the connection member 5 may be made of fiber reinforced plastic, metal, or another material. In this case, the reinforced member 1, the reinforcing member 3, and the connection member 5 may be, but do not need to be, formed of the same materials.

The reinforced member 1 is a plate-shaped member in an example of the respective drawings. The plate-shaped reinforced member 1 includes an attachment surface 1a to which the connection member 5 is attached. The attachment surface 1a is a surface facing in a thickness direction of the plate-shaped reinforced member 1. The attachment surface 1a may be a flat surface, but is not limited to this, and may be a curved surface.

The reinforcing member 3 is coupled to the reinforced member 1 via the connection member 5. FIG. 1 illustrates the first direction D1 and the second direction D2 that are along the attachment surface 1a and that are perpendicular to each other. In the example of FIG. 1, a plurality of the reinforcing members 3 are arranged at intervals in the first direction D1, and each of the reinforcing members 3 extend in an elongated shape in the second direction D2. Each of the reinforcing members 3 has a cross section that is on a plane perpendicular to the second direction D2 and whose size and shape may be constant regardless of positions in the second direction D2. The shape of the cross section of the reinforcing member 3 is a shape of an inverted-L in the example of FIG. 2A, but is not limited to this. A joint portion 3a of the reinforcing member 3 may be formed integrally with the reinforcing member 3, as illustrated in FIG. 2A. Alternatively, the joint portion 3a may be formed as another member separate from the reinforcing member 3, and be then coupled to the reinforcing member 3. This coupling may be made by an adhesive or welding, a bolt or the like, or a combination thereof.

The connection member 5 is provided between the reinforced member 1 and the reinforcing member 3, and couples these two members to each other. According to the present embodiment, the two connection members 5 are arranged such that in a perpendicular direction (the first direction D1 in the example of FIG. 2A), the two connection members 5 face each other, and the joint portion 3a is sandwiched between the two connection members 5. The perpendicular direction is perpendicular to the joining direction D3 (refer to FIG. 2A) in which the reinforced member 1 and the reinforcing member 3 are joined to each other. In this case, assuming that the two connection members 5 forms one pair, a plurality of pairs of the connection members 5 may be arranged at a plurality of respective connection positions at each of which the reinforced member 1 and the reinforcing member 3 are coupled to each other, as illustrated in FIG. 1. The one pair of the connection members 5 may have configurations symmetrical to each other with respect to a plane that is parallel to the joining direction D3 and that passes through a position between these two connection members 5. The pairs of the connection members 5 may have the same configurations regardless of the connection positions. Each of the connection members 5 has a cross section that is on a plane perpendicular to the second direction D2 and whose size and shape may be constant regardless of positions in the second direction D2.

It is assumed that a first perpendicular direction and a second perpendicular direction are each the above-described perpendicular direction (first direction D1), and are opposite to each other. At each of the connection positions, a first coupling portion 5a of the one connection member 5 of the one pair is positioned on a first-perpendicular-direction side (the right side in FIG. 2A) of the joint portion 3a and can receive a load applied from the joint portion 3a to a first-perpendicular-direction side, and a first coupling portion 5a of the other connection member 5 of the one pair is positioned on a second-perpendicular-direction side (the left side in FIG. 2A) of the joint portion 3a and can receive a load applied from the joint portion 3a to a second-perpendicular-direction side.

The connection member 5 includes the first coupling portion 5a and a second coupling portion 5b that are coupled to one and the other of the reinforced member 1 and the reinforcing member 3, respectively. The first coupling portion 5a is coupled to the joint portion 3a of the one (the reinforcing member 3 in the present embodiment) of the reinforced member 1 and the reinforcing member 3 by an adhesive or welding. The connection member 5 is made of a material enabling elastic deformation. In other words, the connection member 5 before being adhered or welded to the reinforcing member 3 is formed so as to be elastically deformable.

Figure 2B:
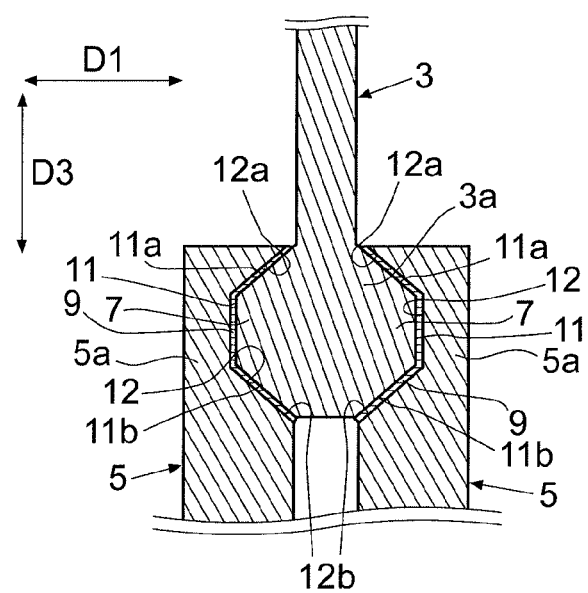
FIG. 2B is a partially enlarged view of FIG. 2A.

FIG. 2B is a partially enlarged view of FIG. 2A, and illustrates the joint portion 3a and the first coupling portion 5a. The joint portion 3a and the first coupling portion 5a are shaped so as to be caught by each other in the joining direction D3 in which the reinforced member 1 and the reinforcing member 3 are joined to each other. According to the present embodiment, the first coupling portion 5a is shaped so as to interpose a part (the below-described protrusion 7) of the joint portion 3a between portions of the first coupling portion 5a in the joining direction D3. In other words, the first coupling portion 5a includes overlapping surfaces 12a and 12b that overlap, in the joining direction D3, with overlapping surfaces 11a and 11b constituting the above-mentioned part of the joint portion 3a. This part is sandwiched between the overlapping surfaces 12a and 12b in the joining direction D3.

The joining direction D3 may denote a direction from a leading end of the joint portion 3a to the closest position of the reinforced member 1, and may denote a direction opposite to this direction. The leading end of the joint portion 3a is included in the joint portion 3a and closest to the reinforced member 1. The above-mentioned closest position of the reinforced member 1 is included in the reinforced member 1 and closest to the joint portion 3a. In the example of FIG. 2, the joining direction D3 is a direction perpendicular to the attachment surface 1a. In the present embodiment, the overlapping surfaces 11a, 11b, 12a, and 12b each face in a direction (e.g., a direction making, with the joining direction D3, an angle larger than 0 degrees and equal to or smaller than 45 degrees) inclined from the joining direction D3.

The joint portion 3a includes the protrusion portion 7 protruding in the perpendicular direction (the first direction D1 in FIG. 2B) perpendicular to the joining direction D3 in which the reinforced member 1 and the reinforcing member 3 are joined to each other. In the present embodiment, the joint portion 3a includes the two protrusion portions 7 protruding in the perpendicular directions opposite to each other. An adhesive 9 for adhering a surface 11 of the protrusion portion 7 to a surface 12 of the first coupling portion 5a is provided between both the surfaces 11 and 12 that face each other. The surface 11 includes the above-described overlapping surfaces 11a and 11b. The surface 12 includes the above-described overlapping surfaces 12a and 12b. Instead of using the adhesive 9, both the surfaces 11 and 12 may be welded to each other. In this case, the joint portion 3a (reinforcing member 3) and the first coupling portion 5a (connection member 5) may be formed of a thermoplastic resin, or a thermoplastic resin film for the welding may be used. A bolt or the like does not need to be used for coupling the joint portion 3a and the connection member 5 to each other.

The second coupling portion 5b may be coupled to the reinforced member 1 by, for example, an adhesive or welding (or a bolt and a nut, or a rivet, or both of an adhesive or welding and a bolt and a nut, or both of an adhesive or welding and a rivet), which is not illustrated in FIG. 1 to FIG. 3. In the example of FIG. 3, a longitudinal member 13 as well as the reinforcing member 3 are coupled to the attachment surface 1a. The longitudinal member 13 extends in the first direction D1. A plurality of the longitudinal members 13 are arranged at intervals in the second direction D2. Each of the longitudinal members 13 is arranged so as to pass in the first direction D1 through a space between the attachment surface 1a and the reinforcing member 3, as illustrated in FIG. 3.

The above-described joint structure 10 may be a monocoque structure in one example. In this case, for example, the plate-shaped reinforced member 1 is an outer plate constituting a fuselage of an aircraft or constituting a body of an automobile. When the reinforced member 1 is an outer plate (skin) constituting a fuselage of an aircraft (e.g., a passenger aircraft), the above-described first direction D1 is an axial direction parallel to a central axis of the fuselage of the aircraft, and the second direction D2 is a circumferential direction around the central axis. Such an outer plate 1 may be formed in a cylindrical shape, for example. For such an outer plate 1, each of the reinforcing members 3 is a frame extending in the circumferential direction, and the attachment surface 1a is an inner circumferential surface extending in the first direction D1 and in the second direction D2. Each of the longitudinal members 13 (stringers) is coupled to the outer plate 1 so as to extend in the axial direction. Although a plurality of pairs of the connection members 5 are provided in the above description, one pair of the connection members 5 may be provided instead of a plurality of pairs of the connection members 5, depending on sizes and shapes of the reinforced member 1 and the reinforcing member 3.

Method for Assembling Joint Structure

Figure 4:
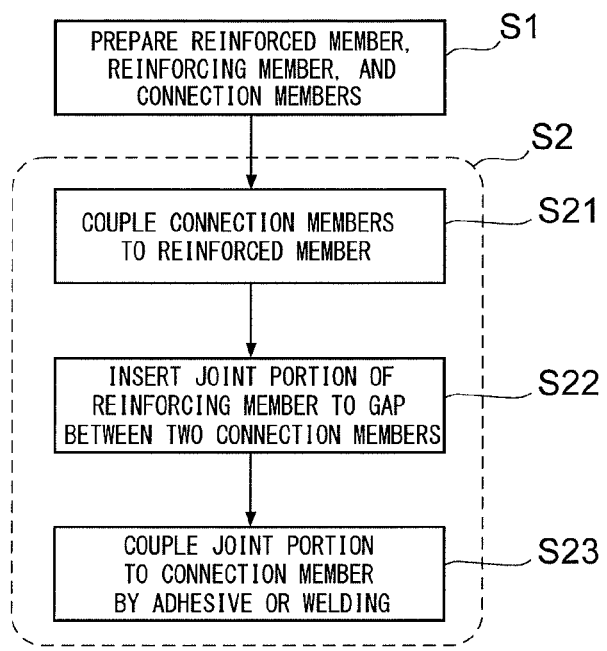
FIG. 4 is a flowchart illustrating a method of assembling the joint structure according to the first embodiment of the present invention.
Figure 5A:
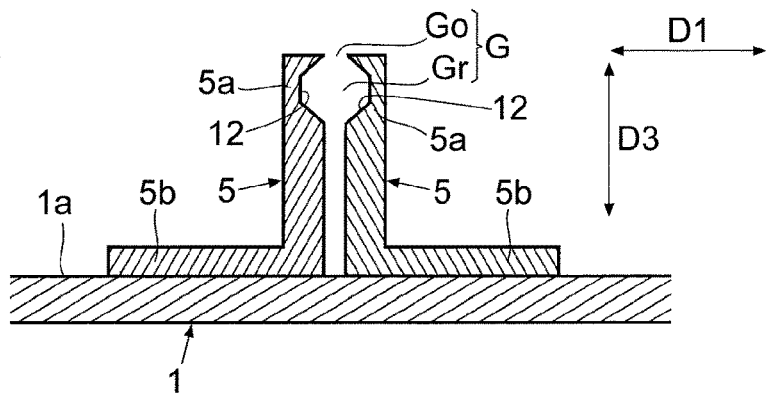
FIG. 5A is an illustration of the method of assembling the joint structure according to the first embodiment of the present invention.
Figure 5B:
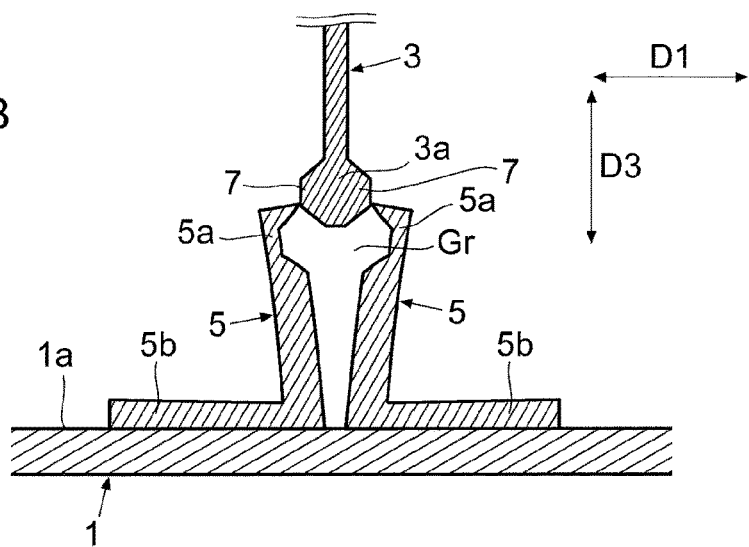
FIG. 5B is another illustration of the method of assembling the joint structure according to the first embodiment of the present invention.
Figure 5C:
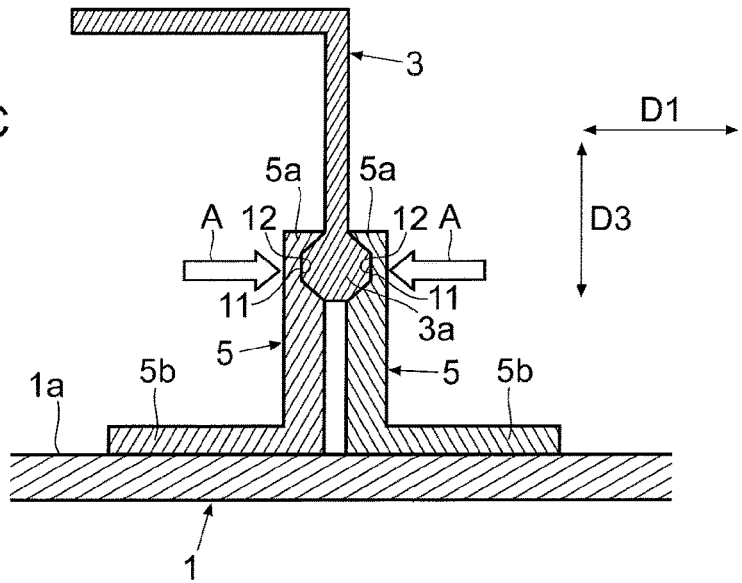
FIG. 5C is another illustration of the method of assembling the joint structure according to the first embodiment of the present invention.

FIG. 4 is a flowchart illustrating a method of assembling the above-described joint structure 10. FIG. 5A to FIG. 5C are illustrations of the method of assembling the joint structure 10.

At the step S1, the reinforced member 1, the reinforcing member 3, and the connection member 5 are prepared.

At the step S2, the first coupling portion 5a of the connection member 5 is coupled to one (the reinforcing member 3 in the present embodiment) of the reinforced member 1 and the reinforcing member 3, and the second coupling portion 5b of the connection member 5 is coupled to the other (the reinforced member 1 in the present embodiment) of the reinforced member 1 and the reinforcing member 3.

Here, the first coupling portion 5a and the reinforcing member 3 may be coupled to each other as follows. In other words, the first coupling portion 5a and the joint portion 3a are arranged such that the first coupling portion 5a and the joint portion 3a are caught by each other in the joining direction D3 (two directions D3 opposite to each other). In this state, the first coupling portion 5a and the joint portion 3a are coupled to each other by an adhesive or welding. The step S2 includes steps S21 to S23.

At the step S21, the second coupling portion 5b of each of the two connection members 5 is coupled to the attachment surface 1a of the reinforced member 1 such that these two connection members 5 face each other in the perpendicular direction (first direction D1) perpendicular to the joining direction D3, as illustrated in FIG. 5A. This coupling may be made by an adhesive or welding, for example, but there is no limitation to this.

The second coupling portions 5b of the two connection members 5 are coupled to the attachment surface 1a by the step S21. In this state, the two connection members 5 extend in the joining direction D3 from the second coupling portions 5b coupled to the attachment surface 1a, so as to form a gap G in the first direction D1 at the first coupling portions 5a between these connection members 5, as illustrated in FIG. 5A. The gap G includes an opening Go facing in the joining direction D3, on a side opposite to the attachment surface 1a (opposite to the second coupling portions 5b). The gap G includes a reception portion Gr closer to the attachment surface 1a (closer to the second coupling portions 5b) than the opening Go. A size of the reception portion Gr in the first direction D1 is larger than a size of the opening Go in the first direction D1. The gap G may have a shape conforming to a shape of the joint portion 3a. For example, the protrusion portions 7 are received in the reception portion Gr at the below-described step S22, and accordingly, the reception portion Gr has a shape conforming to shapes of the protrusion portions 7. Such a gap G is defined by the surfaces 12 of the first coupling portions 5a of the two connection members 5. The gap G penetrates through the two connection members 5 in the second direction D2.

At the step S22, the two connection members 5 are elastically deformed so as to widen the opening Go, as illustrated in FIG. 5B. For example, the two connection members 5 may be elastically deformed so as to widen the opening Go, by human hands or by pushing the joint portion 3a into the opening Go in the joining direction D3. Next, the protrusion portions 7 of the joint portion 3a are inserted into the gap G from the opening Go in the joining direction D3. The protrusion portions 7 are thereby positioned in the reception portion Gr. As a result, the protrusion portions 7 are received in the reception portion Gr, and the joint portion 3a and each of the first coupling portions 5a are arranged so as to be caught by each other in the joining direction D3, as illustrated in FIG. 5C. In the example of FIG. 5C, each of the protrusion portions 7 of the first coupling portions 5a of the respective connection members 5 is thereby brought into a state of being sandwiched, in the joining directions D3, between the overlapping surface 12a and the overlapping surface 12b of the first coupling portion 5a of the corresponding connection member 5, as illustrated in FIG. 2B.

As a result of the step S22, the reinforcing member 3 is supported by the reinforced member 1 via the joint portion 3a and the connection member 5, thus making a temporarily assembled state of the joint structure 10. In other words, elastic force of the connection member 5 prevents the joint portion 3a from being detached from the connection member 5 in any direction.

In the present embodiment, the joint portion 3a has a size (a size in the first direction D1 in the example of FIG. 5A) that gradually increases in a region from its leading end on the side of the attachment surface 1a to its intermediate portion as a position shifts to a side opposite to the attachment surface 1a. Further, this size of the joint portion 3a gradually decreases in a region from its intermediate portion (the portion at which the size becomes maximum) to a predetermined position as a position shifts to the side opposite to the attachment surface 1a. This makes it easy to insert the joint portion 3a into the gap G, from its leading end portion, through the opening Go.

When the joint portion 3a and the first coupling portion 5a are coupled by the adhesive 9, the adhesive 9 may be applied to one or both of the surface 11 of the protrusion portion 7 and the surface 12 of the first coupling portion 5a before the joint portion 3a is inserted into the gap G at the step S22.

In this case, at the step S23, the adhesive 9 is cured to couple the first coupling portion 5a and the joint portion 3a to each other by the adhesive 9. For example, in a state where the protrusion portion 7 is received in the reception portion Gr, the surface 11 and the surface 12 are connected via the adhesive 9, and this state is thus maintained until the adhesive 9 is cured. At this time, the first coupling portions 5a of the respective connection members 5 are pressed toward the joint portion 3a by an appropriate means in the directions (first direction D1) indicated by the arrows A in FIG. 5C. This pressing may be maintained until the adhesive 9 is cured, for example.

In the case where welding is performed instead of the coupling with the adhesive 9, the first coupling portion 5a and the joint portion 3a may be coupled to each other by welding at the step S23 when the joint portion 3a (protrusion portion 7) and the connection member 5 (first coupling portion 5a) are formed of thermoplastic resins. At this time, the first coupling portion 5a and the joint portion 3a themselves may be melted and directly welded and coupled to each other, or both may be coupled to each other by welding with a thermoplastic resin film. When the thermoplastic resin film is used, the joint portion 3a and the connection member 5 do not need to be formed of thermoplastic resins. In such a manner, the surface 11 of the protrusion portion 7 and the surface 12 of the first coupling portion 5a may be coupled to each other by the welding.

In this case, in one example, the surface 11 of the protrusion portion 7 and the surface 12 of the first coupling portion 5a are heated by a heater and thereby melted before the joint portion 3a is inserted into the gap G at the step S22. In this state, the joint portion 3a is inserted into the gap G. Then, at the step S23, the first coupling portions 5a of the respective connection members 5 are kept pressed toward the joint portion 3a by an appropriate means in the directions (first direction D1) indicated by the arrows A in FIG. 5C so as to press the surface 12 against the surface 11 until the melted surface 11 and surface 12 are cooled and solidified and thereby integrated with each other. In another example, at the step S23, vibration welding may cause the protrusion portion 7 inserted into the gap G and the first coupling portion 5a to be coupled to each other directly or via a thermoplastic resin film. Alternatively, at the step S23, another welding method may cause the surface 11 and the surface 12 to be integrated with each other directly or via a thermoplastic resin film so that the joint portion 3a and the first coupling portion 5a are coupled to each other. In the case where the thermoplastic resin film is used as described above, the thermoplastic resin film also can be regarded as the adhesive 9, for example when the joint portion 3a and the first coupling portion 5a are made of a material (e.g., metal) that is not melted at the time of the welding.

Alternatively, at the step S23, the first coupling portions 5a of the respective connection members 5 may be pressed toward the joint portion 3a by an appropriate means while the respective first coupling portions 5a and the joint portions 3a are heated by an external heater or the like. Next, at the step S23, the heating may be stopped. Then, at the step S23, the pressing may be stopped once the adhesive 9 is cured, or once the portion melted for welding is solidified.

Assuming that the two connection members 5 form one pair, the above-described step S2 may be performed for each pair of the connection members 5 when the reinforced member 1 and the one reinforcing member 3 are connected to each other by a plurality of the pairs of the connection members 5 as illustrated in FIG. 1. In this case, after the step S21 is performed for a plurality of the pairs of the connection members 5, the steps S22 and S23 may be performed simultaneously for a plurality of the pairs of the connection members 5. Also when a plurality of the reinforcing members 3 are provided as illustrated in FIG. 1, each of the reinforcing members 3 may be coupled to the reinforced member 1 via a plurality of pairs of the connection members 5 as described above.

Other Configuration Examples of First Embodiment

In the first embodiment, shapes of the joint portion 3a and the connection member 5 are not limited to the shapes illustrated in FIG. 2A and FIG. 2B. For example, the joint portion 3a and the connection member 5 may have shapes illustrated in FIG. 6A or FIG. 6B. Each of FIG. 6A and FIG. 6B is a view of the IIA-IIA arrows in FIG. 1 (i.e., corresponds to FIG. 2B), but illustrates the case where the joint portion 3a and the connection member 5 have other shapes.

Figure 6A:
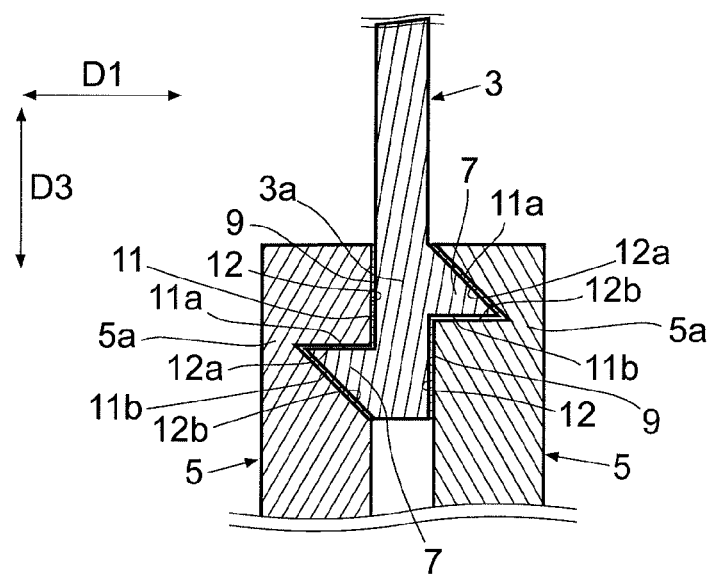
FIG. 6A illustrates another configuration example of a connection member and a joint portion.
Figure 6B:
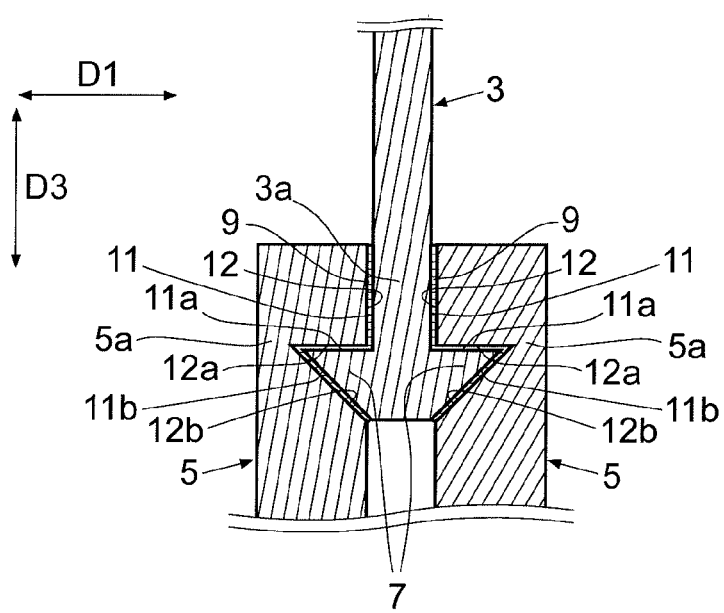
FIG. 6B illustrates still another configuration example of the connection member and the joint portion.

The following describes the configuration example of FIG. 6A and the configuration example of FIG. 6B. The matters that are not described below for the joint structure 10 and the method of assembling the same in the case of these configuration examples may be the same as those described above.

In the example of FIG. 6A, the joint portion 3a is provided with the two protrusion portions 7 that protrude in directions (first direction D1) perpendicular to the joining direction D3 and opposite to each other. One (on the right side in FIG. 6A) of the two protrusion portions 7 includes an overlapping surface 11b facing in the joining direction D3 toward a side of the attachment surface 1a, and includes an overlapping surface 11a facing toward a side opposite to the attachment surface 1a in a direction inclined from the joining direction D3. The other protrusion portion 7 includes an overlapping surface 11a facing in the joining direction D3 toward a side opposite to the attachment surface 1a, and includes an overlapping surface 11b facing toward a side of the attachment surface 1a in a direction inclined from the joining direction D3.

The two connection members 5 provided for such a joint portion 3a have the following shapes. The surface 12 of one of the connection members 5 includes surfaces 12a and 12b facing, and coupled to, the overlapping surfaces 11a and 11b of the one protrusion portion 7, respectively. The surface 12 of the other connection member 5 includes surfaces 12a and 12b facing, and coupled to, the overlapping surfaces 11a and 11b of the other protrusion portion 7, respectively In the example of FIG. 6B, the joint portion 3a is provided with the two protrusion portions 7 that protrude in directions (first direction D1) perpendicular to the joining direction D3 and opposite to each other. Each of the two protrusion portions 7 includes an overlapping surface 11b facing toward a side of the attachment surface 1a in a direction inclined from the joining direction D3, and includes an overlapping surface 11a facing in the joining direction D3 toward a side opposite to the attachment surface 1a. Each of the two connection members 5 provided for such a joint portion 3a includes surfaces 12a and 12b facing, and coupled to, the overlapping surfaces 11a and 11b of the corresponding protrusion portion 7, respectively.

Advantageous Effects of First Embodiment

According to the first embodiment, the joint portion 3a of the reinforcing member 3 and the connection member 5 are coupled to each other by the adhesive 9 or welding, and the joint portion 3a and the first coupling portion 5a of the connection member 5 are shaped so as to be caught by each other in the joining direction D3. Thus, the joint portion 3a and the connection member 5 are coupled to each other by the adhesive 9 or welding and further caught by each other in the joining direction D3 so that mechanical strength of the coupled portion between the joint portion 3a and the connection member 5 can be secured in the joining direction D3. Accordingly, a bolt or the like does not need to be used for coupling the joint portion 3a and the connection member 5 to each other. Thus, a hole thorough which a bolt or the like penetrates does not need to be formed in the joint portion 3a and the connection member 5, the number of components of the joint structure 10 is decreased, and a work load of assembling the joint structure 10 is reduced.

Figure 7:
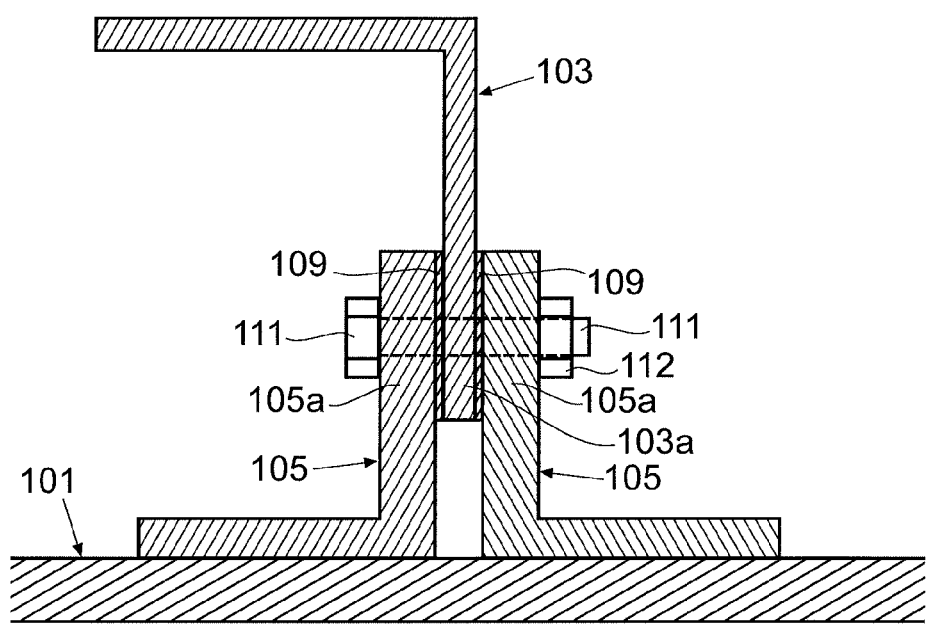
FIG. 7 illustrates configurations of a connection member and a joint portion according to a reference example.

Meanwhile, FIG. 7 illustrates a configuration of a reference example, and corresponds to FIG. 2A. In FIG. 7, a connection member 105 that connects a reinforced member 101 and a reinforcing member 103 to each other is coupled to a joint portion 103a of the reinforcing member 103 by an adhesive 109. However, the adhesive 109 alone achieves insufficient mechanical strength in the joining direction D3, for a coupled portion between the joint portion 103a and the connection member 105. For this reason, the joint portion 103a and the connection member 105 are connected to each other further by a bolt 111 and a nut 112. In this case, differently from the first embodiment of the present invention, a hole through which the bolt 111 penetrates needs to be formed in the joint portion 103a and the connection member 105. In contrast, according to the joint structure 10 of the first embodiment, such a hole for a bolt does not need to be formed as described above. Such an advantageous effect can be gained against the case where, instead of the bolt 111 and the nut 112, rivet coupling is used in FIG. 7 in order to achieve mechanical strength, which is not illustrated in the drawing.

Further, according to the first embodiment, each of the connection members 5 is elastically deformable. Thus, the connection member 5 is inserted into the gap G while elastically deformed as in the above-described step S22. Thereby, temporary assembling of the joint structure 10 can be easily made.

Second Embodiment

Figure 8:
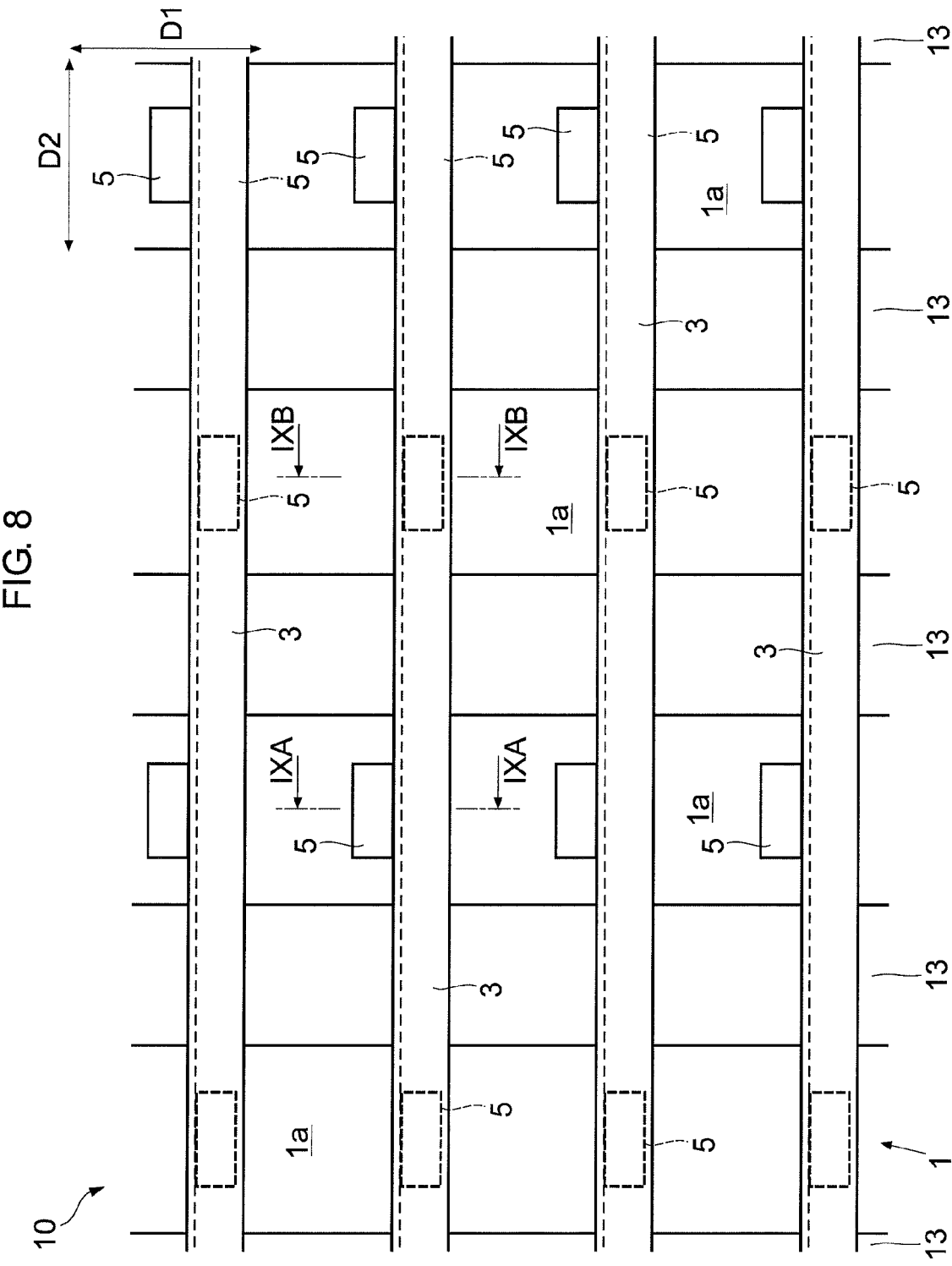
FIG. 8 illustrates a joint structure according to a second embodiment of the present invention.
Figure 9A:
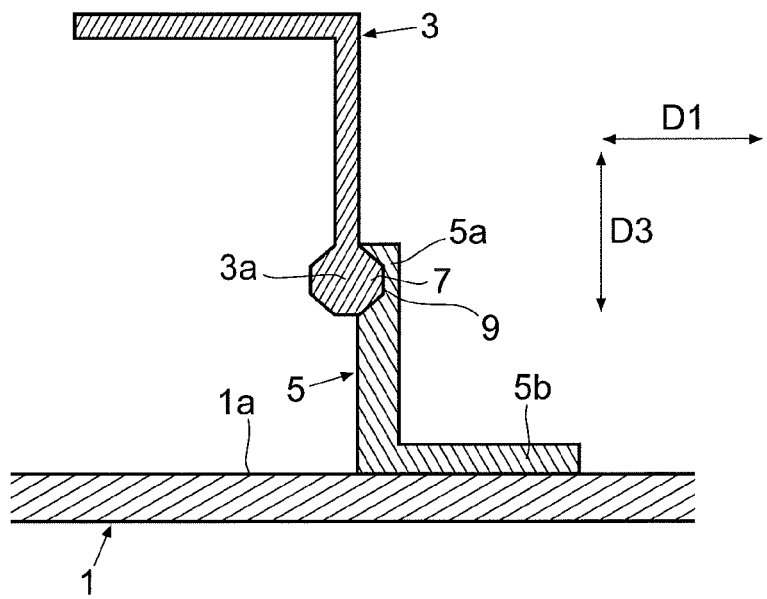
FIG. 9A is a view of the IXA-IXA arrows in FIG. 8.
Figure 9B:
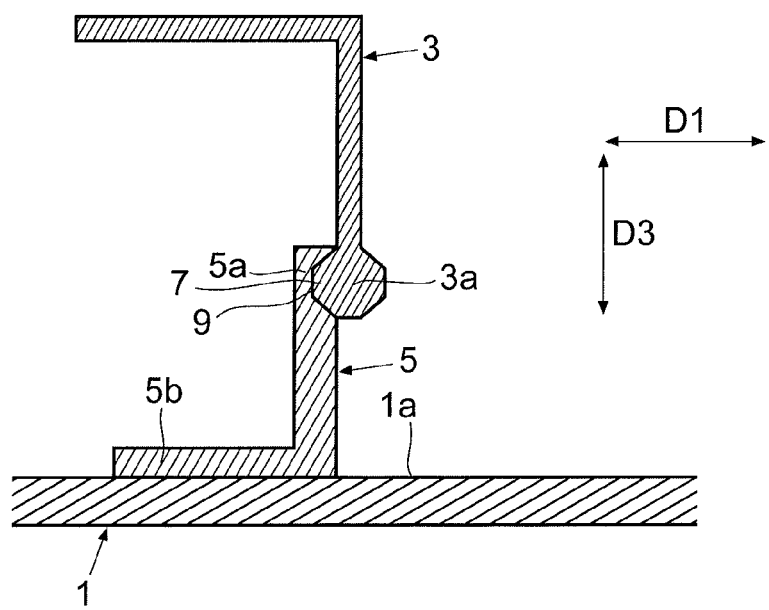
FIG. 9B is a view of the IXB-IXB arrows in FIG. 8.

FIG. 8 illustrates a joint structure 10 according to a second embodiment of the present invention. FIG. 9A is a view of the IXA-IXA arrows in FIG. 8. FIG. 9B is a view of the IXB-IXB arrows in FIG. 8. The following describes the second embodiment, but configurations of the joint structure 10 of the second embodiment and a method of assembling the same that are not described below may be the same as those in the first embodiment.

In the second embodiment, the reinforced member 1 and the reinforcing member 3 are connected to each other at each of a plurality of connection positions by the one connection member 5 instead of a plurality of the connection members 5. Hereinafter, two directions (first direction D1) perpendicular to the joining direction D3 and opposite to each other are assumed to be a first perpendicular direction (a right direction in FIG. 9A and FIG. 9B) and a second perpendicular direction (a left direction FIG. 9A and FIG. 9B).

At one of the connection positions, the first coupling portion 5a of the connection member 5 is positioned on a first-perpendicular-direction side of the joint portion 3a, and can receive a first-perpendicular-direction load from the joint portion 3a, as illustrated in FIG. 9A. At this connection position, the first coupling portion 5a and the joint portion 3a are coupled to each other in the first perpendicular direction by an adhesive 9 or welding. The adhesive 9 is provided between both of these as illustrated in FIG. 9A.

At another connection position, the first coupling portion 5a of the connection member 5 is positioned on a second-perpendicular-direction side of the joint portion 3a, and can receive a second-perpendicular-direction load from the joint portion 3a, as illustrated in FIG. 9B. At this connection position, the first coupling portion 5a and the joint portion 3a are coupled to each other in the second perpendicular direction by an adhesive 9 or welding. The adhesive 9 is provided between both of these as illustrated in FIG. 9B.

In the example of FIG. 8, a plurality of the connection members 5 are arranged in a zigzag manner at each of the reinforcing members 3 extending in an elongated shape in the second direction D2. In other words, at each of the reinforcing members 3, for each combination of the two connection members 5 adjacent to each other in the second direction D2, the one connection member 5 is positioned on the first-perpendicular-direction side of the joint portion 3a, and the other connection member 5 is positioned on the second-perpendicular-direction side of the joint portion 3a. In this case, configurations (the joint portion 3a, the connection member 5, the adhesive 9, and the like) concerning each connection position may be the same as those in the case of FIG. 9A or FIG. 9B. In other words, a plurality of the connection members 5 positioned on the first-perpendicular-direction side of the joint portion 3a and a plurality of the connection members 5 positioned on the second-perpendicular-direction side of the joint portion 3a are arranged in the zigzag manner when viewed in the joining direction D3 (the direction perpendicular to the paper sheet of FIG. 8).

In the method of assembling the joint structure 10 according to the second embodiment, the steps S21 to S23 of the above-described step S2 are performed as follows.

At the step S21, for the one reinforcing member 3, the second coupling portion 5b of the one connection member 5 is coupled to the one attachment surface 1a at each of the connection positions that are different from each other in the second direction D2. At this time, these connection members 5 are arranged in the zigzag manner as described above.

At the step S22, the one reinforcing member 3 is arranged such that this reinforcing member 3 (joint portion 3a) is sandwiched in the first direction D1 between the connection members 5 provided at the different connection positions, and the joint portion 3a and the first coupling portion 5a are caught by each other in the joining direction D3 at each of the connection positions, as illustrated in FIG. 9A and FIG. 9B.

At the step S23, in the state of the arrangement made at the step S22, the first coupling portion 5a and the joint portion 3a are coupled by the adhesive 9 or welding at each of the connection positions.

According to the second embodiment, each of the reinforcing members 3 is sandwiched in the first direction D1 between the connection members 5 provided at the connection positions that are different from each other in the second direction D2. Accordingly, the reinforcing member 3 is prevented from being displaced from the connection members 5 in each of the first perpendicular direction and the second perpendicular direction, thus maintaining a state where the joint portion 3a and the first coupling portion 5a are caught by each other in the joining direction D3. Therefore, the same advantageous effect as that of the first embodiment can be gained while the number of connection members 5 are made smaller than that in the case of the first embodiment. Thus, the configuration of the first embodiment or the second embodiment can be adopted depending on mechanical strength intended for the joint structure 10.

In the second embodiment, the connection members 5 (that are provided at the different connection positions and that interpose the reinforcing member 3 between themselves in the first direction D1) and the joint portion 3a may be same as the one connection member 5, the other connection member 5, and the joint portion 3a in FIG. 6A or FIG. 6B, respectively, or may have other shapes.

The present invention is not limited to the above-described embodiments. As a matter of course, various modifications can be made within the scope of the technical idea of the present invention. For example, any one of the following modified examples 1 to 3 may be adopted, or two or more of the modified examples 1 to 3 may be arbitrarily combined to be adopted. In this case, the matters that are not described below may be the same as those described above.

Modified Example 1

Figure 10:
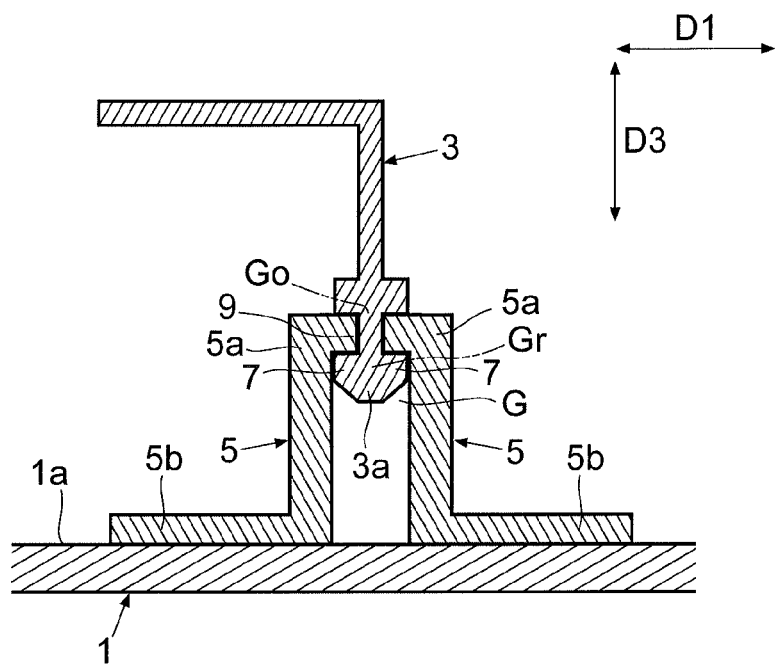
FIG. 10 illustrates another configuration example of the connection member and the joint portion.

According to the modified example 1, the joint portion 3a may be shaped so as to interpose, between portions of the joint portion 3a, a part of each of the first coupling portions 5a in the joining direction D3 as illustrated in FIG. 10. FIG. 10 is a view of the IIA-IIA arrows in FIG. 1, but illustrates a configuration example where the joint portion 3a and the connection member 5 have other shapes. When these shapes are applied to the first embodiment or the second embodiment described above, the other configurations of the joint structure 10 and the method of assembling this joint structure 10 may be the same as those described above.

Modified Example 2

According to the modified example 2, in the case where the reinforcement member 1 is not flat, or in another appropriate case, a joint portion having the same configuration as that of the above-described joint portion 3a may be provided at the reinforced member 1, instead of providing the joint portion 3a at the reinforcing member 3. In this case, the first coupling portion 5a of the connection member 5 is coupled to the joint portion of the reinforced member 1, and the second coupling portion 5b of the connection member 5 is coupled to the reinforcing member 3. Here, the first coupling portion 5a and the joint portion of the reinforced member 1 are coupled to each other by the same configurations as those by which the first coupling portion 5a and the joint portion 3a described above are coupled to each other. Further, the second coupling portion 5b and the reinforcing member 3 may be coupled to each other by an adhesive or welding (or a bolt and a nut, or a rivet, or a combination of an adhesive or welding and a bolt and a nut, or both of an adhesive or welding and a rivet).

Modified Example 3

Figure 11A:
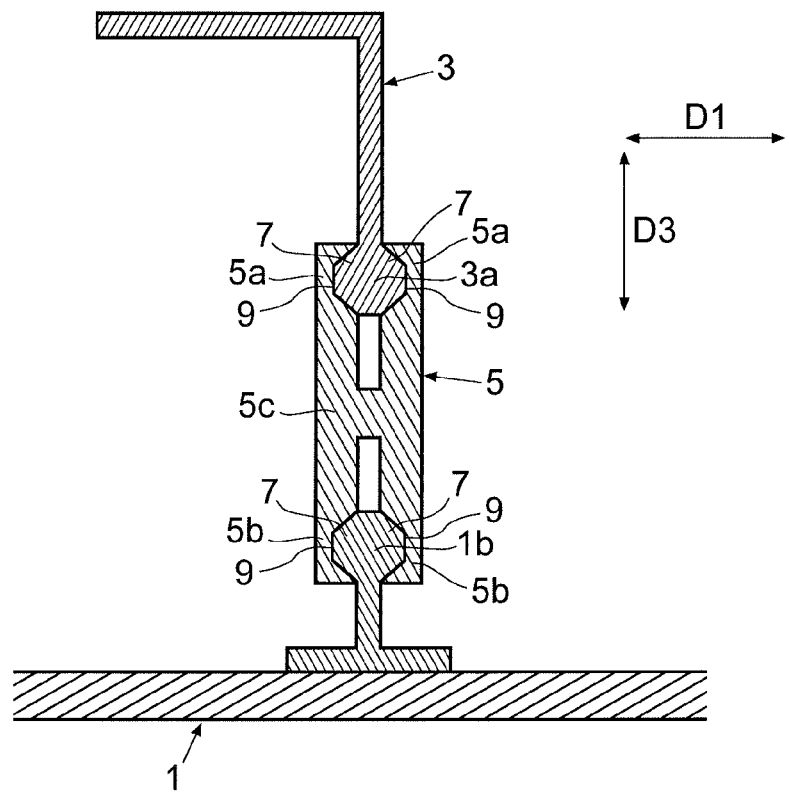
FIG. 11A illustrates another configuration example of the connection member and the joint portion.

According to the modified example 3, the second coupling portion 5b of the connection member 5 is coupled to a joint portion 1b of the reinforced member 1 by an adhesive 9 or welding as illustrated in FIG. 11A, and the second coupling portion 5b and the joint portion 1b may be shaped so as to be caught by each other in the joining direction D3 in which the reinforced member 1 and the reinforcing member 3 are joined to each other. FIG. 11A is a view of the IIA-IIA arrows in FIG. 1, but illustrates a configuration example where the second coupling portion 5b of the connection member 5 is coupled to the reinforced member 1 in such a manner. In the example of FIG. 11A, the connection member 5 includes the two first coupling portions 5a, the two second coupling portions 5b, and an intermediate portion 5c.

The two first coupling portions 5a are arranged such that in a direction (first direction D1) perpendicular to the joining direction D3, the two first coupling portions 5a face each other, and the joint portion 3a of the reinforcing member 3 is sandwiched between the two first coupling portions 5a. The two first coupling portions 5a each have the same configuration (a shape, a material, and the like) and function as those of the two first coupling portions 5a in the one pair of the connection members 5 in the first embodiment. Accordingly, their detailed description is omitted. In FIG.

11A, the joint portion 3a of the reinforcing member 3 is the same as the joint portion 3a in the first embodiment.

The two second coupling portions 5b are arranged such that in the direction (first direction D1) perpendicular to the joining direction D3, the two second coupling portions 5b face each other, and the joint portion 1b of the reinforced member 1 is sandwiched between the two second coupling portions 5b. The joint portion 1b may be formed integrally with the reinforced member 1. Alternatively, the joint portion 1b may be formed as a member separate from the reinforced member 1, and may be then coupled to the reinforced member 1. This coupling may be made by an adhesive or welding, a bolt or the like, or a combination thereof.

The two second coupling portions 5b and the joint portion 1b in the modified example 3 may have the same functions (e.g., the same configuration (shape and material)) as those of the two first coupling portions 5a and the joint portion 3a in the modified example 3. For example, the joint portion 1b may include the protrusion portions 7 that are caught by the respective second coupling portions 5b in the joining direction D3.

The intermediate portion 5c is positioned between the two first coupling portions 5a and the two second coupling portions 5b, and is coupled to the two first coupling portions 5a and the two second coupling portions 5b. For example, the intermediate portion 5c, the respective first coupling portions 5a, and the respective second coupling portions 5b may be formed integrally with each other.

Figure 11B:
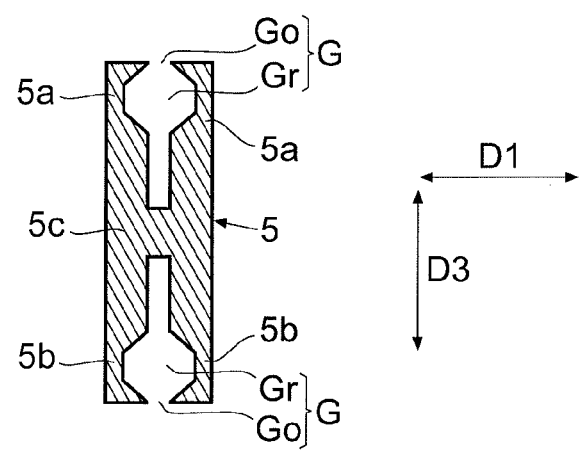
FIG. 11B illustrates the connection member in FIG. 11A.

FIG. 11B is a diagram of FIG. 11A in which illustrations of the configurations other than that of the connection member 5 are omitted. As illustrated in FIG. 11B, the connection member 5 forms a gap G in the first direction D1 between the two first coupling portions 5a, and also forms a gap G in the first direction D1 between the two second coupling portions 5b. Each of the gaps G includes an opening Go at an end in the joining direction D3 and a reception portion Gr on a side closer to the intermediate portion 5c than the opening Go. The opening Go and the reception portion Gr have configurations (shapes, sizes, and the like) and functions that are the same as those of the opening Go and the reception portion Gr in the case of the first embodiment.

Figure 12A:
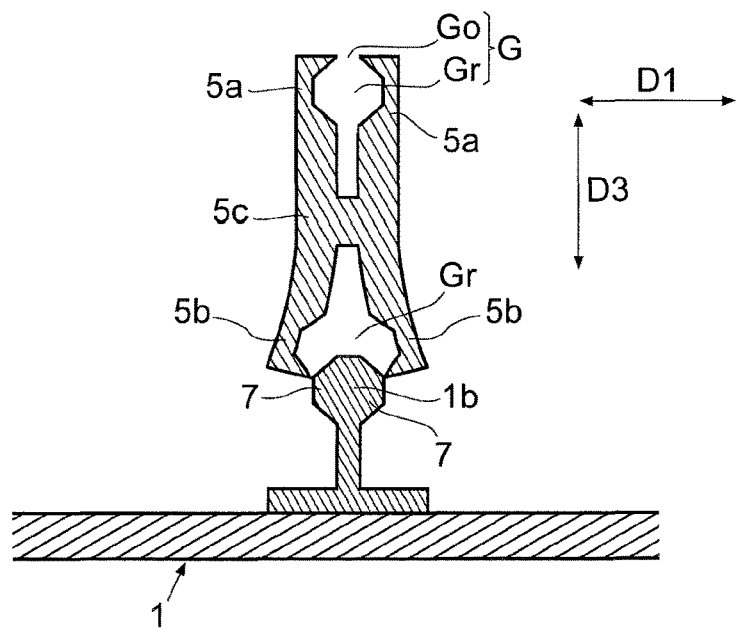
FIG. 12A is an illustration of a method of assembling a joint structure in the case of FIG. 11A.
Figure 12B:
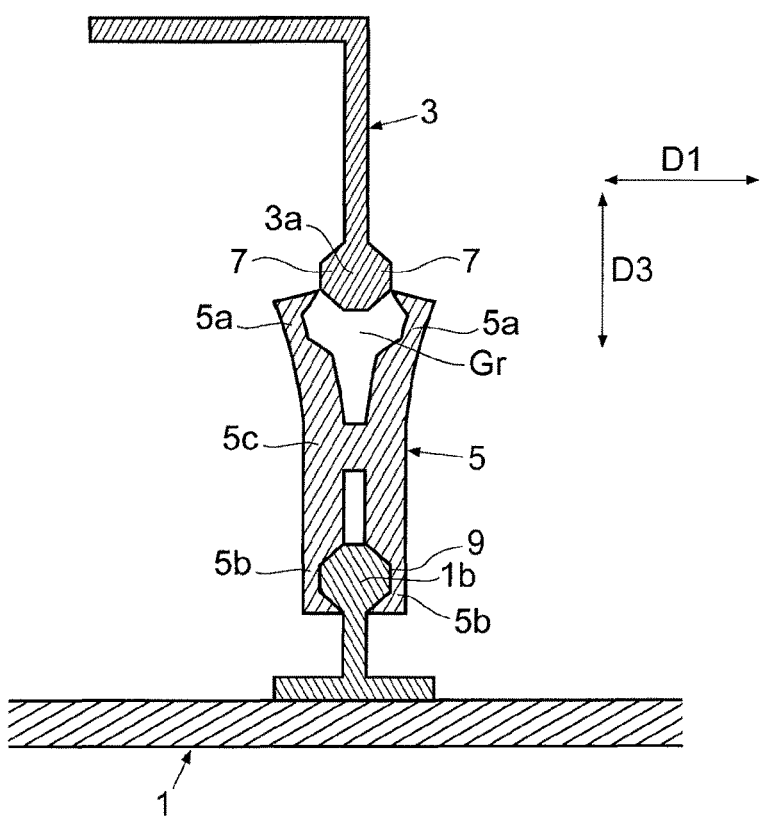
FIG. 12B is another illustration of the method of assembling the joint structure in the case of FIG. 11A.

FIG. 12A and FIG. 12B are views corresponding to FIG. 11A, and illustrate one example of the method of assembling the joint structure 10 according to the modified example 3. In the method of assembling the joint structure 10 according to the modified example 3, the above-described step S2 may be performed as follows.

At the step S2 in the above-described assembling method, the connection member 5 is elastically deformed so as to widen the opening Go of the gap G that is formed by the two second coupling portions 5b, as illustrated in FIG. 12A. Next, the connection member 5 is attached to the joint portion 1b such that the joint portion 1b (protrusion portions 7) passes through this opening Go and is thus arranged in the reception portion Gr. Then, the connection member 5 is elastically deformed so as to widen the opening Go of the gap G that is formed by the two first coupling portions 5a, as illustrated in FIG. 12B. Next, the joint portion 3a is attached to the connection member 5 such that the joint portion 3a (protrusion portions 7) passes through this opening Go and is thus arranged in the reception portion Gr. Then, the first coupling portion 5a and the joint portion 3a are coupled to each other by an adhesive 9 or welding, and the second coupling portion 5b and the joint portion 1b are coupled to each other by an adhesive 9 or welding.

Here, a timing of applying the adhesive 9, a timing of heating and pressing each portion for welding, and the like may be the same as those in the case of first embodiment described above, or may be appropriately changed. After the connection member 5 is attached to the joint portion 3a of the reinforcing member 3, the joint portion 1b of the reinforced member 1 may be attached to the connection member 5. In this case, other matters may be the same as those described above. The reinforced member 1 and the reinforcing member 3 may be coupled by the connection member 5 at one connection position or at each of a plurality of connection positions as in the first embodiment.

REFERENCE SIGNS LIST 1 reinforced member (outer plate), 1a attachment surface, 1b joint portion, 3 reinforcing member (frame), 3a joint portion, 5 connection member, 5a first coupling portion, 5b second coupling portion, 5c intermediate portion, 7 protrusion portion, 9 adhesive, 10 joint structure, 11 surface of joint portion, 11a and 11b overlapping surface, 12a and 12b overlapping surface, 13 longitudinal member, G gap, D1 first direction, D2 second direction, D3 joining direction

The invention claimed is:

1. A joint structure in which a reinforced member and a reinforcing member are coupled to each other, the joint structure comprising:
    a plurality of elastically deformable connection members provided between the reinforced member and the reinforcing member and connecting the reinforced member and the reinforcing member to each other,
    the reinforced member, the reinforcing member, and each of the plurality of connection members are mutually different members,
    the reinforced member includes an attachment surface to which the plurality of connection members are attached,
    a first direction and a second direction defined, with respect to the attachment surface, as being perpendicular to each other wherein the reinforcing member extends in an elongated shape in a position selected in the first direction, along the second direction,
    the reinforcing member having a joint portion projecting in a joining direction that intersects the attachment surface,
    each of the plurality of connection members includes:
        either a first coupling portion coupled to the reinforcing member by an adhesive or welding to a first side of the joint portion or a first opposing coupling portion coupled to the reinforcing member by an adhesive or welding to an opposite second side of the joint portion, and
        a second coupling portion attached to the reinforced member,
    the plurality of connection members including connection members with the first coupling portion and connection members with the first opposing coupling portions, respectively,
    the first coupling portions and the first opposing coupling portions shaped so as to catch the joint portion of the reinforcing member therebetween in the joining direction, and
    connection members with the first coupling portion being arranged in a series of selectively spaced connection positions in the second direction, connection members with the first opposing coupling portion being arranged in a second series of selectively spaced connection positions in the second direction, and the joint portion is sandwiched, between the respective connection members with the first coupling portion and connection members with the first opposing coupling portion, the first direction having a first left direction perpendicular to the second direction and a first right direction perpendicular to the second direction that is opposite the first left direction, the joint portion including a protrusion portion that protrudes in the first left direction, the first coupling portions shaped so as to interpose the protrusion portion between portions of the first coupling portion in the joining direction, the joint portion including a second protrusion portion that protrudes in the first right direction, the first opposing coupling portions shaped so as to interpose the second protrusion portion between portions of the first opposing coupling portion in the joining direction, and each connection member with the first coupling portion can receive a load applied from the joint portion in the first left direction and each connection member with the first opposing coupling portion can receive a load applied from the joint portion in the first right direction to thereby maintain the reinforcing member in the position selected in the first direction, along the second direction by impeding displacement of the reinforcing member in the first direction.

2. The joint structure according to claim 1, wherein:
the series of selective spacing of connection positions of connection members with the first coupling portion is arranged with the second series of selective spacing of connection positions of connection members with the first opposing coupling portion such that pairs of connection members that face each other are defined to interpose the joint portion therebetween.

3. A method of assembling the joint structure of claim 2 that joins the reinforced member with the reinforcing member, the method comprising:
attaching the plurality of connection members to the reinforced member via respective second coupling portions including:
attaching connection members with the first coupling portion to the reinforced member in the series of selectively space connection positions in the second direction;
attaching connection members with the first opposing coupling portion to the reinforced member via respective second coupling portions in the second series of selectively space connection positions in the second direction,
inserting the joint portion of the reinforcing member between the first coupling portions and the first opposing coupling portions in the joining direction, and
coupling the joint portion of the reinforcing member to the first coupling portions and the first opposing coupling portions by the adhesive or welding.

4. The joint structure according to claim 1, wherein the series of selective spacing of connection positions of connection members with the first coupling portion is arranged with the second series of selective spacing of connection positions of connection members with the first opposing coupling portion such that connection positions of connection members with the first coupling portion are staggered in the second direction from the connection positions of connection members with the first opposing coupling portion.

5. The joint structure according to claim 4, wherein a connection positions of connection members with the first coupling portion are arranged in a zigzag manner in the second direction with respect to connection positions of connection members with the first opposing coupling portion.

6. A method of assembling the joint structure of claim 5 that joins the reinforced member with the reinforcing member, the method comprising:
attaching the plurality of connection members to the reinforced member via respective second coupling portions including:
attaching connection members with the first coupling portion to the reinforced member in the series of selectively space connection positions in the second direction;
attaching connection members with the first opposing coupling portion to the reinforced member via respective second coupling portions in the second series of selectively space connection positions in the second direction,
inserting the joint portion of the reinforcing member between the first coupling portions and the first opposing coupling portions in the joining direction, and
coupling the joint portion of the reinforcing member to the first coupling portions and the first opposing coupling portions by the adhesive or welding.

7. A method of assembling the joint structure of claim 4 that joins the reinforced member with the reinforcing member, the method comprising:
attaching the plurality of connection members to the reinforced member via respective second coupling portions including:
attaching connection members with the first coupling portion to the reinforced member in the series of selectively space connection positions in the second direction;
attaching connection members with the first opposing coupling portion to the reinforced member via respective second coupling portions in the second series of selectively space connection positions in the second direction,
inserting the joint portion of the reinforcing member between the first coupling portions and the first opposing coupling portions in the joining direction, and
coupling the joint portion of the reinforcing member to the first coupling portions and the first opposing coupling portions by the adhesive or welding.

8. A method of assembling the joint structure of claim 1 that joins the reinforced member with the reinforcing member, the method comprising:
attaching the plurality of connection members to the reinforced member via respective second couplings portions including:
attaching connection members with the first coupling portion to the reinforced member in the series of selectively space connection positions in the second direction;
attaching connection members with the first opposing coupling portion to the reinforced member via respective second coupling portions in the second series of selectively space connection positions in the second direction,
inserting the joint portion of the reinforcing member between the first coupling portions and the first opposing coupling portions in the joining direction, and coupling the joint portion of the reinforcing member to the first coupling portions and the first opposing coupling portions by the adhesive or welding.

9. A method of joining a reinforced member with a reinforcing member, the reinforced member includes an attachment surface having a first direction and a second direction that are perpendicular to each other on which the reinforcing member is to be joined extending in an elongated shape in a position selected in the first direction, along the second direction, the first direction having a first left direction perpendicular to the second direction and a first right direction perpendicular to the second direction that is opposite the first left direction, the reinforcing member having a joint portion projecting therefrom, the method comprising:

providing a plurality of elastically deformable connection members for connecting the reinforced member and the reinforcing member to each other, such that:

the reinforced member, the reinforcing member, and each of the plurality of connection members are mutually different members, each of the plurality of connection members includes:

either a first coupling portion for coupling to the reinforcing member to a first side of the joint portion or a first opposing coupling portion for coupling to the reinforcing member to an opposite second side of the joint portion, and a second coupling portion for attachment to the reinforced member, the plurality of connection members including connection members with the first coupling portion and connection members with the first opposing coupling portions, respectively, the first coupling portions and the first opposing coupling portions shaped so as to catch the joint portion of the reinforcing member therebetween when the connection members are attached to the attachment surface of the reinforced member in a joining direction that intersects the attachment surface, the joint portion including a protrusion portion that protrudes in the first left direction, the first coupling portions shaped so as to interpose the protrusion portion between portions of the first coupling portion in the joining direction, the joint portion including a second protrusion portion that protrudes in the first right direction, the first opposing coupling portions shaped so as to interpose the second protrusion portion between portions of the first opposing coupling portion in the joining direction, and attaching the plurality of connection members to the reinforced member via respective second coupling portions including:

attaching connection members with the first coupling portion in a series of selectively spaced connection positions in the second direction, and attaching connection members with the first opposing coupling portion in a second series of selectively spaced connection positions in the second direction, inserting the joint portion of the reinforcing member between the respective connection members with the first coupling portion and connection members with the first opposing coupling portion, whereby each of connection member with the first coupling portion can receive a load applied from the joint portion in the first left direction and each of connection member with the first opposing coupling portion can receive a load applied from the joint portion in the first right direction side to thereby maintain the reinforcing member in the position selected in the first direction, along the second direction by impeding displacement of the reinforcing member in the first direction, and coupling the joint portion of the reinforcing member to the first coupling portions and the first opposing coupling portions by an adhesive or welding.

* * * * *